(12) United States Patent
Yamaguchi et al.

(10) Patent No.: US 8,304,571 B2
(45) Date of Patent: Nov. 6, 2012

(54) PERFLUOROPOLYETHER-MODIFIED POLYSILOXANE, A METHOD FOR PREPARING THE SAME AND A DEFOAMING AGENT COMPRISING THE SAME

(75) Inventors: Hiromasa Yamaguchi, Takasaki (JP); Noriyuki Koike, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 361 days.

(21) Appl. No.: 12/834,439

(22) Filed: Jul. 12, 2010

(65) Prior Publication Data

US 2011/0015420 A1 Jan. 20, 2011

(30) Foreign Application Priority Data

Jul. 17, 2009 (JP) ................. 2009-169424
Jul. 17, 2009 (JP) ................. 2009-169433

(51) Int. Cl.
*C08G 77/46* (2006.01)
*C07F 7/08* (2006.01)

(52) U.S. Cl. ........ 556/434; 556/411; 556/431; 556/438; 556/439

(58) Field of Classification Search ............... None
See application file for complete search history.

(56) References Cited

U.S. PATENT DOCUMENTS

| | | | |
|---|---|---|---|
| 4,329,528 A | 5/1982 | Evans | |
| 4,900,474 A | 2/1990 | Terae et al. | |
| 6,218,499 B1 * | 4/2001 | Tarumi et al. | 528/42 |
| 2006/0264596 A1 | 11/2006 | Yamaguchi et al. | |
| 2008/0071042 A1 | 3/2008 | Yamane et al. | |

FOREIGN PATENT DOCUMENTS

| | | |
|---|---|---|
| JP | 35-12564 | 3/1958 |
| JP | 59-22611 A | 2/1984 |
| JP | 60-22907 A | 2/1985 |
| JP | 2-51644 B2 | 11/1990 |
| JP | 2006-321764 A | 11/2006 |
| JP | 2008-88412 A | 4/2008 |
| JP | 2008-308628 A | 12/2008 |
| JP | 2009-157760 A | 7/2009 |

OTHER PUBLICATIONS

U.S. Appl. No. 12/817,656, Yamaguchi et al.

* cited by examiner

*Primary Examiner* — Yevegeny Valenrod
(74) *Attorney, Agent, or Firm* — Birch, Stewart, Kolasch & Birch, LLP

(57) ABSTRACT

The present invention relates to a perfluoropolyether-modified polysiloxane represented by general formula (1):

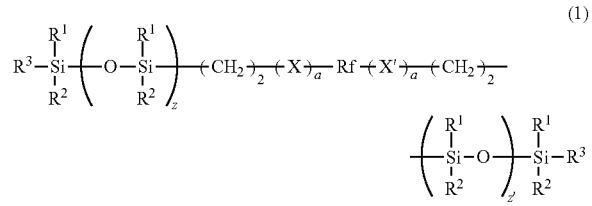

wherein X is a divalent group represented by formula —$CH_2$—, —$CH_2O$—, —$CH_2OCH_2$— or —Y—NR—CO—;
$R^1$, $R^2$, and $R^3$ are, independently of each other, an alkyl group having 1 to 10 carbon atoms or an aryl group;
X' is a divalent group represented by formula —$CH_2$—, —$OCH_2$—, —$CH_2OCH_2$— or —CO—NR—Y'—,
a is, independently of each other, 0 or 1;
z and z' are, independently of each other, an integer of 5 to 100; and
Rf is a divalent group represented by the following general formula (2):

$$-C_tF_{2t}[OCF_2CF(CF_3)]_m-OCF_2(CF_2)_rCF_2O[CF(CF_3)CF_2O]_nC_tF_{2t}- \quad (2)$$

or by the following general formula (3):

$$-C_tF_{2t}(OCF_2CF_2)_u(OCF_2)_vOC_tF_{2t}- \quad (3).$$

5 Claims, 1 Drawing Sheet

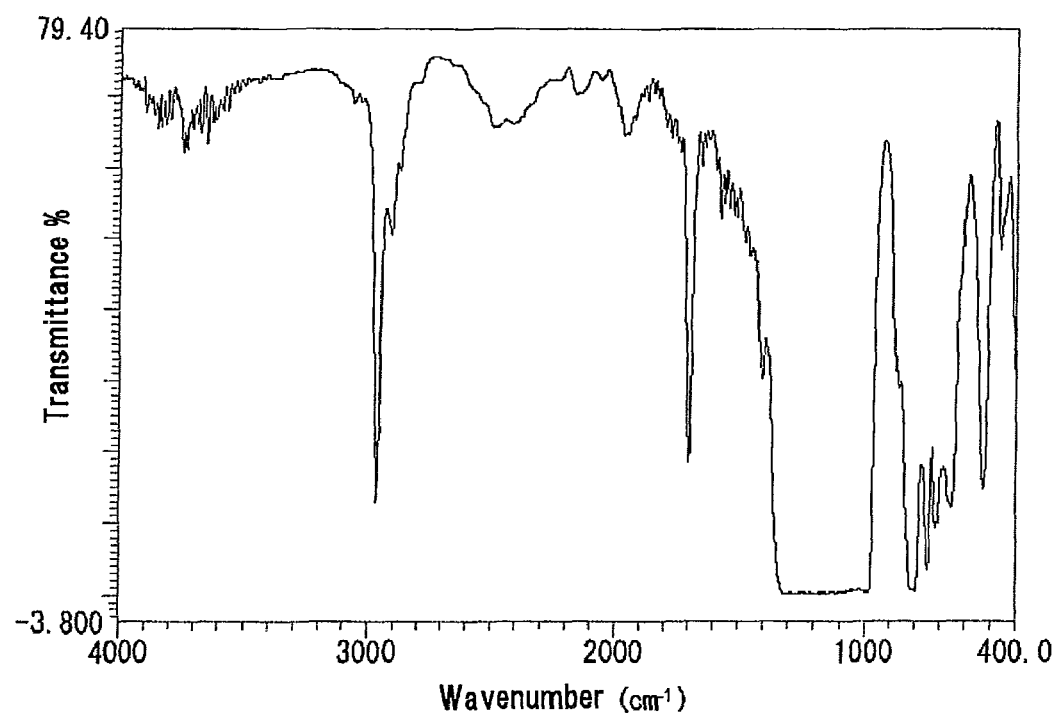

PERFLUOROPOLYETHER-MODIFIED POLYSILOXANE, A METHOD FOR PREPARING THE SAME AND A DEFOAMING AGENT COMPRISING THE SAME

CROSS REFERENCES

This application claims the benefits of Japanese Patent Application No. 2009-169433 filed on Jul. 17, 2009 and Japanese Patent Application No. 2009-169424 filed on Jul. 17, 2009 the contents of which are incorporated herein by reference.

FIELD OF THE INVENTION

The present invention relates to a perfluoropolyether-modified polysiloxane which has the properties of both of a perfluoropolyether and a silicone and which is good in affinity with materials such as paints, cosmetics and various coating materials; a method for preparing the perfluoropolyether-modified polysiloxane; and a defoaming agent comprising the perfluoropolyether-modified polysiloxane, in particular, having a good defoaming effect to foam of organic solvents.

BACKGROUND OF THE INVENTION

Generally, perfluoropolyether group-containing compounds have very small surface energy and, accordingly, have unique properties such as water- and oil-repellency, chemical resistance, lubricating property, demoldability, and stain resistance. Therefore, they find applications, on account of such properties, as water- and oil-repelling, stain-proofing agents in paper and fiber; lubricating agents in magnetic recording media; oil proof agents in precision machinery; mold release agents; cosmetics; and protecting films. However, the low surface energy of the perfluoropolyether group-containing compounds result in very poor compatibility and affinity with materials such as organic solvents, paints, cosmetics and various coating materials. Therefore, it has been pointed out that where a perfluoropolyether group-containing compound is added to various industrial materials to provide the afore-mentioned properties, problems arise, for instance, in dispersion stability and, therefore, the application of the perfluoropolyether group-containing compounds is difficult.

Also polysiloxanes, i.e., silicone, have a small surface energy and, therefore, have properties such as water-repellency, lubricating property, and demoldability. However, polysiloxanes have a better affinity with materials such as organic solvents, paints, cosmetics, and various coating materials than the perfluoropolyethers. Their dispersion stability can be enhanced by various modifications. Therefore, polysiloxanes can be added to various industrial materials to provide the materials with characteristics of silicone. Thus they are used as an additive to improve performance in various fields. A perfluoropolyether-modified polysiloxane is synthesized as a compound having both of a perfluoropolyether group and a polysiloxane chain (Patent Literatures 1 to 5).

Various defoaming agents are conventionally used in industrial processes where foaming occurs. Inter alia, defoaming silicone agents are widely used, such as oil compounds, comprising a silicone oil such as dimethylpolysiloxane, methylphenylpolysiloxane and methylvinylpolysiloxane, and fine powder of silica; and an emulsion of these oil compounds dispersed in water with a surfactant, because the defoaming silicone agents show various good natures such as better chemical stability and effects even in a smaller amount than the other defoaming agents.

Although these defoaming silicone agents attain the good defoaming effect in aqueous systems, they show an extremely small defoaming effect in organic solvent systems which have a lower surface tension and greater solubility for silicone than in aqueous systems. Japanese Patent Publication No. Sho-35-12564 describes the use of particularly highly viscous dimethylpolysiloxane for a defoaming agent for organic solvent systems, but the defoaming effects are not always satisfactory. Japanese Patent Application Laid-Open Nos. Sho-59-22611 and Sho-60-22907 describe a defoaming agent comprising a perfluoroether as an effective component. Japanese Patent Publication No. Sho-35-12564 and U.S. Pat. No. 4,329,528 describe a defoaming agent for organic solvents comprising a perfluoroalkyl group-containing siloxane as an effective component. Japanese Patent Application Laid-Open No. Hei-2-51644 describes a defoaming agent for organic solvent comprising a perfluoroether group-containing siloxane as an effective component. None of these defoaming agents is well satisfactory. Therefore, a defoaming silicone agent is desired which has a good defoaming effect for organic solvent systems. (See the following Patent Literatures 4 to 8).

PRIOR ART LITERATURE

[Patent Literature 1] Japanese Patent Application Laid-Open No. 2006-321764
[Patent Literature 2] Japanese Patent Application Laid-Open No. 2008-308628
[Patent Literature 3] Japanese Patent Application Laid-Open No. 2008-88412
[Patent Literature 4] Japanese Patent Application Laid-Open No. Sho-59-22611
[Patent Literature 5] Japanese Patent Application Laid-Open No. Sho-60-22907
[Patent Literature 6] Japanese Patent Publication No. Sho-35-12564
[Patent Literature 7] U.S. Pat. No. 4,329,528
[Patent Literature 8] Japanese Patent Publication No. Hei-2-51644

SUMMARY OF THE INVENTION

Problems to be Solved by the Invention

However, if a modification ratio by the fluorine atoms is raised in order to enhance the characteristics of the perfluoropolyether group, affinity with other materials lowers significantly to cause a problem in dispersion stability. Therefore, there is a need for a compound which has the characteristics of both of perfluoropolyether and silicone and also has good affinity with materials such as organic solvents, paints, cosmetics and various coating materials. The present invention has been made to fulfill the afore-mentioned need. Thus, the purpose of the present invention is to provide a compound which has the characteristics of both of perfluoropolyether and silicone and also has good affinity with materials such as organic solvents, paints, cosmetics and various coating materials and to provide a defoaming silicone agent showing a good defoaming effect and foaming suppressing effect for organic solvents.

Means to Solve the Problems

The present inventors have made research to attain the afore-mentioned purpose and have found the following compound which has characteristics of both of perfluoropolyether and silicone and also has good affinity with materials such as organic solvents, paints, cosmetics and various coating materials and that a defoaming agent composed mainly of this compound attains a good defoaming effect for organic solvents.

Namely, the present invention provides a perfluoropolyether-modified polysiloxane represented by general formula (1):

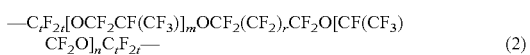
(1)

wherein X is a divalent group represented by formula —$CH_2$—, —$CH_2O$—, —$CH_2OCH_2$— or —Y—NR—CO—, wherein Y is a divalent group represented by —$CH_2$— or the following formula:

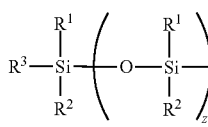

and R is a hydrogen atom, an alkyl group having 1 to 10 carbon atoms or an aryl group;

$R^1$, $R^2$, and $R^3$ are, independently of each other, an alkyl group having 1 to 10 carbon atoms or an aryl group;

X' is a divalent group represented by formula —$CH_2$—, —$OCH_2$—, —$CH_2OCH_2$— or —CO—NR—Y'—, wherein Y' is a divalent group represented by formula —$CH_2$— or the following formula:

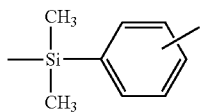

and R is as defined above;

a is, independently of each other, 0 or 1;

z and z' are, independently of each other, an integer of 5 to 100; and

Rf is a divalent group represented by the following general formula (2):

—$C_rF_{2r}[OCF_2CF(CF_3)]_mOCF_2(CF_2)_rCF_2O[CF(CF_3)CF_2O]_nC_rF_{2r}$— (2)

wherein m and n are integer of 1 to 150, provided that an average of a total of m and n is 2 to 200;

r is an integer of 0 to 6;

t is 2 or 3; and $C_rF_{2r}$ is linear or branched;

or by the following general formula (3):

—$C_rF_{2r'}(OCF_2CF_2)_u(OCF_2)_vOC_rF_{2r'}$— (3)

wherein u is an integer of 1 to 200;

v is an integer of 1 to 50;

t' is an integer of 1 to 3; and $C_rF_{2r'}$ is linear or branched.

Further, the present invention provides a method for preparing the afore-mentioned perfluoropolyether-modified polysiloxane, wherein a vinyl group-containing perfluoropolyether represented by general formula (5):

$CH_2=CH—(X)_a—Rf—(X')_a—CH=CH_2$ (5)

wherein Rf, X, X' and a are as defined above, is hydrosilylated with an SiH group-containing polysiloxane represented by general formula (6):

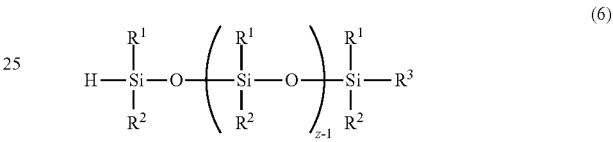
(6)

wherein $R^1$, $R^2$, $R^3$, and z are as defined above.

Further, the present invention provides a defoaming agent composed mainly of the afore-mentioned perfluoropolyether-modified polysiloxane represented by general formula (1).

Effects of the Invention

The perfluoropolyether group-containing organopolysiloxane represented by the afore-mentioned formula (1) has a small surface tension, good affinity with organic solvents, and good dispersibility in organic solvents and, therefore, attains a good defoaming effect for organic solvents.

BRIEF DESCRIPTION OF A DRAWING

FIG. 1 shows an IR spectrum of the compound prepared in Example 1.

BEST MODES OF THE INVENTION

The present invention will be further described in detail below.

Perfluoropolyether-Modified Polysiloxane

The present perfluoropolyether-modified polysiloxane is represented by general formula (1) as mentioned above. In formula (1), Rf is a divalent group represented by the following formula (2):

—$C_rF_{2r}[OCF_2CF(CF_3)]_mOCF_2(CF_2)_rCF_2O[CF(CF_3)CF_2O]_nC_rF_{2r}$— (2)

wherein m and n are an integer of 1 to 150, provided that an average of a total of m and n is 2 to 200; r is an integer of 0 to 6; t is 2 or 3; and $C_rF_{2r}$ is linear or branched, or by the following general formula (3):

—$C_rF_{2r'}(OCF_2CF_2)_u(OCF_2)_vOC_rF_{2r'}$— (3)

wherein u is an integer of 1 to 200; v is an integer of 1 to 50; t' is an integer of 1 to 3; and $C_rF_{2r'}$ is linear or branched.

Specific examples of Rf represented by the afore-mentioned formula (2) include the groups represented by the following formula (7):

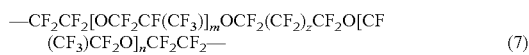   (7)

wherein m and n are integer of 1 to 150, provided that an average of a total of m and n is 2 to 200; and z is an integer of 0 to 6;
or by the following formula (8):

(8)

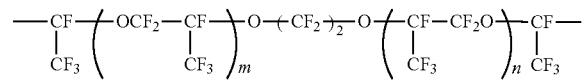

wherein m and n are integer of 1 to 150, provided that an average of a total of m and n is 2 to 200. Inter alia, Rf is preferably a group represented by the afore-mentioned formula (8) or the afore-mentioned general formula (3).

In formula (1), $R^1$, $R^2$, and $R^3$ are, independently of each other, an alkyl group having 1 to 10 carbon atoms or an aryl group, such as methyl, ethyl, isopropyl, n-butyl, isobutyl, cyclohexyl, phenyl, and 2-phenylpropyl groups. Inter alia, preferred are methyl, n-butyl and phenyl groups.

In formula (1), X is a divalent group represented by formulas —$CH_2$—, —$CH_2O$—, —$CH_2OCH_2$— or —Y—NR—CO—, wherein Y is a divalent group represented by formula —$CH_2$— or the following formula:

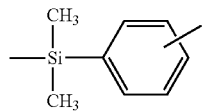

and R is a hydrogen atom, an alkyl group having 1 to 10 carbon atoms or an aryl group, such as methyl, ethyl, isopropyl, n-butyl, isobutyl, cyclohexyl, phenyl, and 2-phenylpropyl groups. Inter alia, preferred are a hydrogen atom, methyl, n-butyl and phenyl groups.

In formula (1), X' is a divalent group represented by formula —$CH_2$—, —$OCH_2$—, —$CH_2OCH_2$— or —CO—NR—Y'—, wherein Y' is a divalent group represented by formula —$CH_2$— or the following formula:

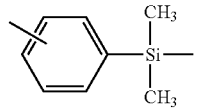

and R is as defined above.

In formula (1), a is, independently of each other, 0 or 1, and z and z' are, independently of each other, an integer of 5 to 100, preferably 10 to 60.

The perfluoropolyether chain and the polysiloxane chain in the compound of formula (1) are present in such a mass ratio that the fluorine atoms are 20 to 70% by mass, more preferably 25 to 55% by mass, relative to the whole molecule. Below the afore-mentioned lower limit, the characteristics of the perfluoropolyether chain, such as water- and oil-repellency, a lubricating property and demoldability, may be worse. Above the afore-mentioned upper limit, the compatibility with other materials may be worse. In the defoaming agent, decrease in the surface tension of the present organopolysiloxane is insufficient below the afore-mentioned lower limit, so that the defoaming effect is insufficient for a system which comprises an organic solvent with a small surface tension or a fluorine-containing surfactant. Above the afore-mentioned upper limit, solubility in organic solvents is worse, so that variety of organic solvents which can be used as a diluent for a defoaming agent are limited; and its dispersibility in organic solvents or migration to foam is worse and, therefore, the defoaming effect, particularly a foam-destroying-property, and prompt effectiveness are not attained sufficiently.

Examples of the present perfluoropolyether-modified polysiloxane include the following.

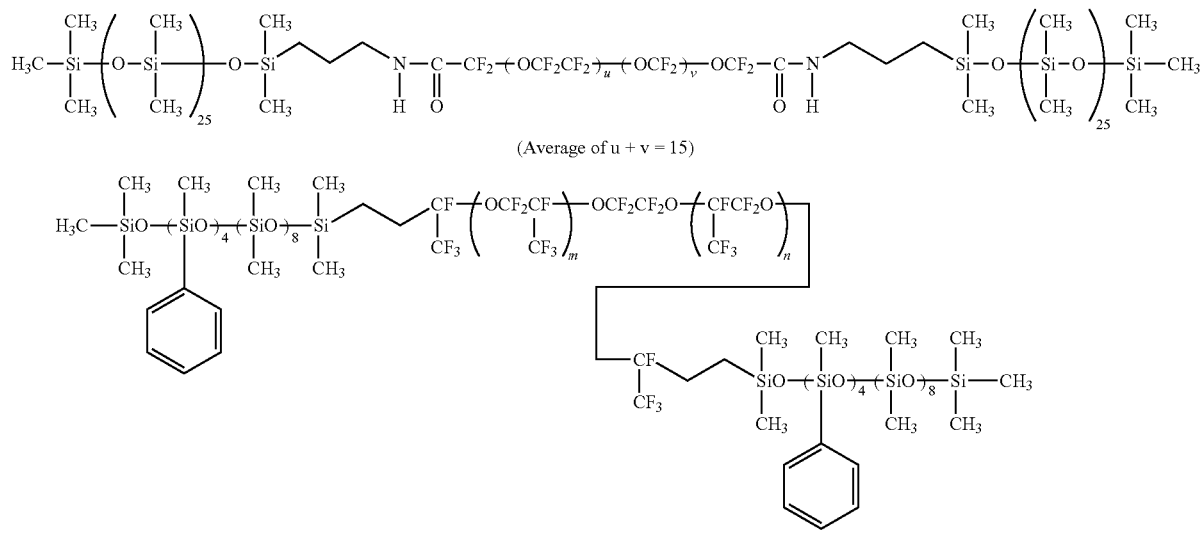

-continued
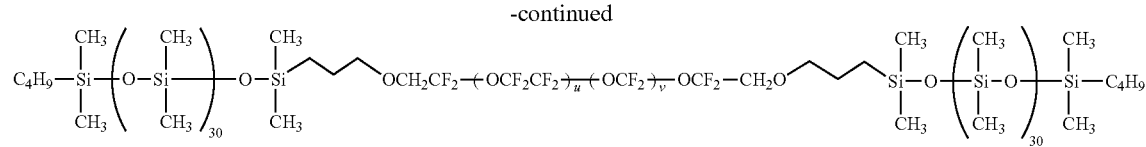
(Average of u + v = 15)
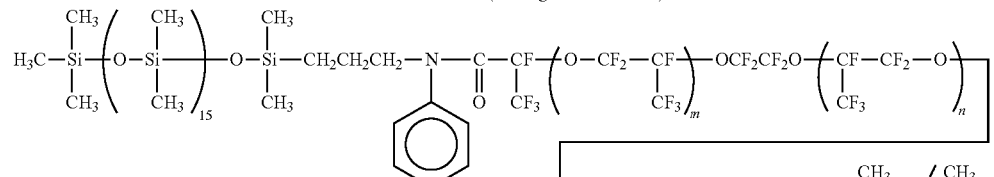
(Average of m + n = 35)
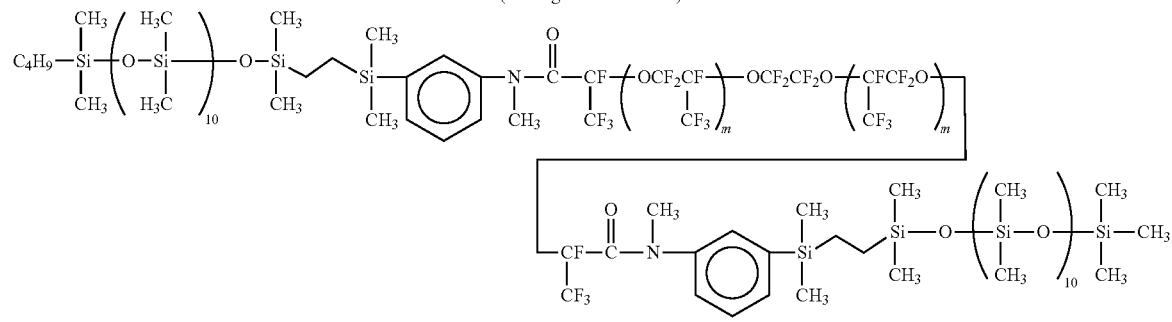
(Average of m + n = 35)
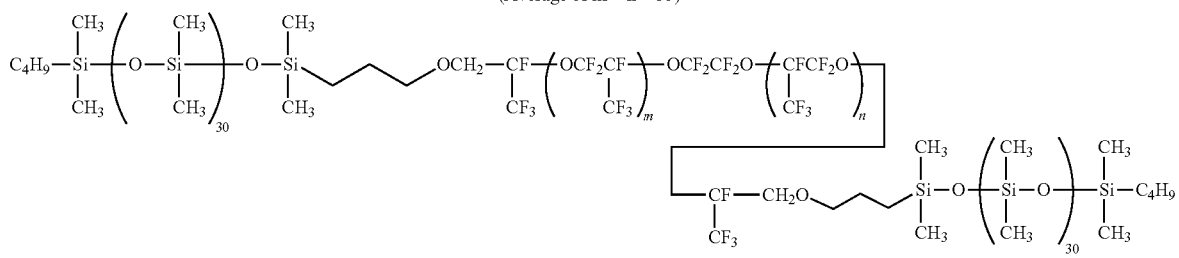
(Average of m + n = 15)
Inter alia, the perfluoropolyether modified-polysiloxane represented by the following formula (4) is preferred,
(4)
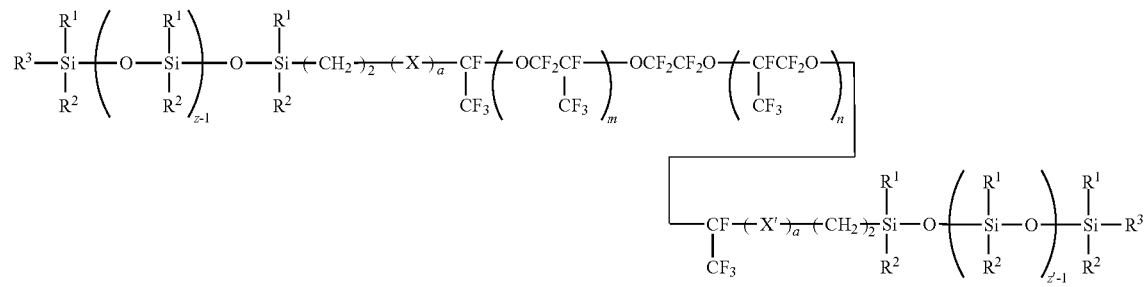

wherein a, X, X', $R^1$, $R^2$, $R^3$, m, n, z and z' are as defined above.

Method for Preparing the Perfluoropolyether-Modified Polysiloxane

For the preparation of the afore-mentioned perfluoropolyether-modified polysiloxane, a vinyl group containing—perfluoropolyether represented by general formula (5):

$$CH_2=CH-(X)_a-Rf-(X')_a-CH=CH_2 \quad (5)$$

wherein Rf, X, X' and a are as defined above, is hydrosilylated with an SiH group-containing polysiloxane represented by general formula (6):

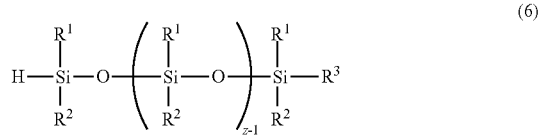

wherein $R^1$, $R^2$, $R^3$ and z are as defined above, preferably in the presence of a platinum catalyst.

The afore-mentioned vinyl group-containing perfluoropolyether and the SiH group-containing polysiloxane are subjected to the reaction preferably in a molar ratio, Vi/H, of 0.8 to 1.2, more preferably 0.9 to 1.1. If the amount of the perfluoropolyether exceeds the above upper limit, compatibility with other materials may be worse. Meanwhile, the amount of the polysiloxane is too large, a resulting product may be cloudy or the SiH group may cause a dehydrogenation reaction to generate hydrogen gas, which is not preferred.

Conventional platinum catalysts for hydrosilylation may be used as the platinum catalyst. Generally, compounds of noble metals are expensive and, therefore, platinum or platinum compounds which are relatively less expensive are often used. Examples of the platinum compound include chloroplatinic acid; complexes of chloroplatinic acid with an olefin such as ethylene, with an alcohol, or with a vinyl siloxane; and metal platinum supported on silica, alumina or carbon. Examples of the metal catalyst of the platinum family other than platinum include rhodium, ruthenium, iridium and palladium compounds such as $RhCl(PPh_3)_3$, $RhCl(CO)(PPh_3)_2$, $Ru_3(CO)_{12}$, $IrCl(CO)(PPh_3)_2$ and $Pd(PPh_3)_4$, wherein Ph is a phenyl group.

The platinum catalyst may be used in a catalytic amount, preferably in 0.1 to 500 ppm, reduced to a platinum content, relative to 100 parts by mass of a total amount of the perfluoropolyether and the polysiloxane.

A reaction temperature may be properly determined, depending upon amounts and kinds of solvents and may be usually room temperature to 200 degrees C., preferably 70 to 140 degrees C. A reaction time is not particularly limited as long as the reaction precedes sufficiently under particular reaction conditions.

The afore-mentioned hydrosilylation may be carried out in the presence of a solvent, if needed. The solvent can desirably dissolves both of the perfluoropolyether and the polysiloxane, but are not particularly limited. Those which dissolve either one of the reactants may be used as long as those do not hinder the hydrosilylation. An amount of solvent is properly determined, depending upon viscosity of the perfluoropolyether and the polysiloxane and amounts of reactants, and is preferably 10 to 200 parts by mass, more preferably 20 to 100 parts by mass, relative to 100 parts by mass of a total amount of the perfluoropolyether and the polysiloxane.

Examples of the solvents include aliphatic hydrocarbons such as n-hexane, n-heptane, isooctane, and isododecane; aromatic hydrocarbons such as toluene and xylene; fluorine-containing aromatic hydrocarbons such as trifluorotoluene and hexafluorometaxylene; hydrofluoroethers such as perfluorobutyl methyl ether, perfluorobutyl ethyl ether and 1,1,1,2,2,3,4,5,5,5-decafluoro-3-methoxy-4-(trifluoromethyl) pentane; chlorofluorocarbons such as Daifloil ex Daikin Industries, Ltd.; linear siloxanes such as hexamethyldisiloxane, octamethyltrisiloxane, decamethyltetrasiloxane, dodecamethylpentasiloxane, and 2-(trimethylsiloxy)-1,1,1,2,3,3,3-heptamethyltrisiloxane; cyclic siloxanes such as ocatamethylcyclopentasiloxane and decamethylcyclopentasiloxane; pertluoropolyethers such as Fomblin, Galden (ex Solvay Solexis), Demnum (ex Daikin Industries Ltd.), and Krytox (ex Du Pont). Inter alia, hexafluorometaxylene and decamethylpentasiloxane are preferred, because these well dissolve the perfluoropolyether of formula (5), the polysiloxane of formula (6) and the resulting products.

The present defoaming agent is composed mainly of the afore-mentioned perfluoropolyether-modified polysiloxane. The present defoaming agent may be composed only of the perfluoropolyether-modified polysiloxane, but is desirably diluted with a proper solvent. Preferably, the polysiloxane is dissolved in a solvent in such an amount that the content of the polysiloxane is 0.1 to 50% by mass to form a defoaming agent.

Examples of the solvents include aliphatic hydrocarbons such as n-hexane, n-heptane, isooctane, and isododecane; aromatic hydrocarbons such as toluene and xylene; ketones such as methyl ethyl ketone, methyl isobutyl ketone and diisobutyl ketone; fluorine-containing aromatic hydrocarbons such as trifluorotoluene and hexafluorometaxylene; hydrofluoroethers such as perfluorobutyl methyl ether, perfluorobutyl ethyl ether and 1,1,1,2,2,3,4,5,5,5-decafluoro-3-methoxy-4-(trifluoromethyl)pentane; chlorofluorocarbons such as Daifloil ex Daikin Industries, Ltd.; linear siloxanes such as hexamethyldisiloxane, octamethyltrisiloxane, decamethyltetrasiloxane, dodecamethylpentasiloxane, and 2-(trimethylsiloxy)-1,1,1,2,3,3,3-heptamethyltrisiloxane; cyclic siloxanes such as ocatamethylcyclopentasiloxane and decamethylcyclopentasiloxane; and perfluoropolyethers such as Fomblin, Galden (ex Solvay Solexis), Demnum (ex Daikin Industries Ltd.), and Krytox (ex Du Pont). Inter alia, isododecane, methyl isobutyl ketone and hexafluorometaxylene are preferred, because these well dissolve the perfluoropolyether-modified polysiloxanes and are dispersible in organic solvents.

In addition to the perfluoropolyether-modified polysiloxane represented by the afore-mentioned formula (1), the present defoaming agent may further comprise the perfluoropolyether-modified polysiloxane which is described as a deforming component in Japanese Patent Application No. 2009-157760 and represented by the following formula (9),

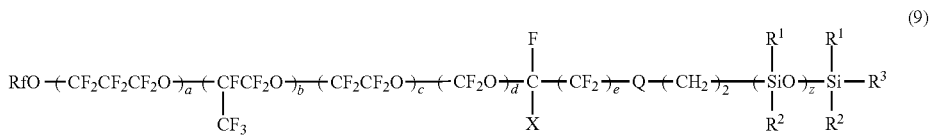

(9)

wherein Rf is a linear or branched perfluoroalkyl group having 1 to 10 carbon atoms; X is a fluorine atom or a trifluoromethyl group; Q is a divalent organic group having 1 to 12 carbon atoms; $R^1$, $R^2$, and $R^3$ are, independently of each other, an alkyl group having 1 to 10 carbon atoms; a, b, c and d are, independently of each other, an integer of 0 to 200, provided that a total of a, b, c and d is 1 or greater; e is 0 or 1; and z is an integer of 5 to 100.

Examples of the perfluoropolyether-modified polysiloxanes represented by the afore-mentioned formula (9) include the following.

Inter alia, the perfluoropolyether modified-polysiloxane represented by the following formula (2) is preferred,

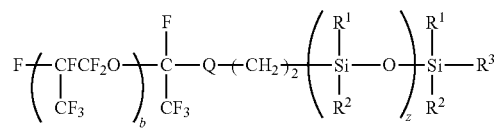

wherein b, Q, $R^1$, $R^2$, $R^3$ and z are as defined above.

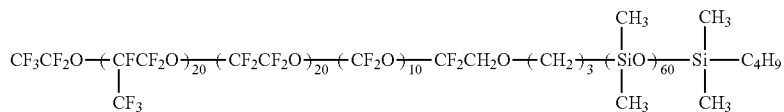

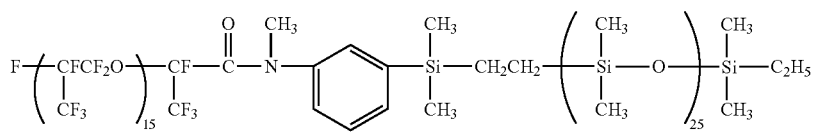

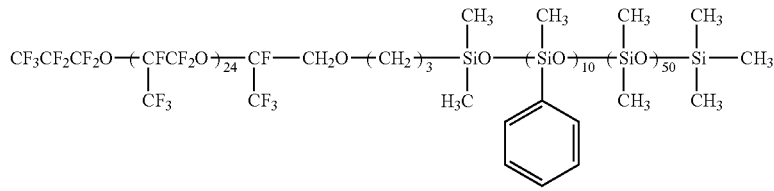

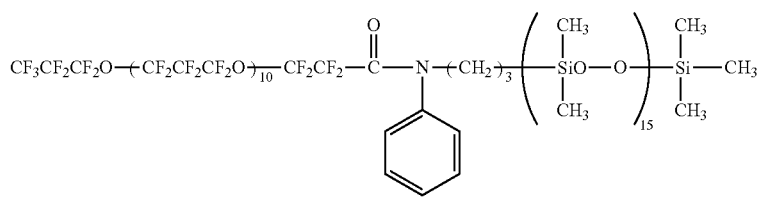

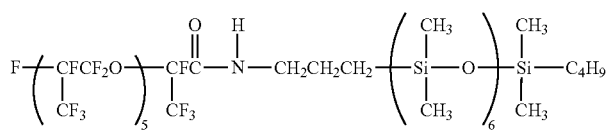

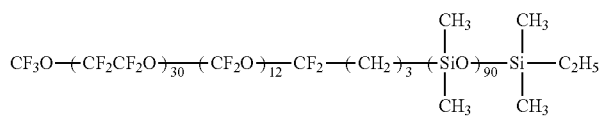

The present defoaming agent may optionally comprise fine particles of silica in order to improve foam-destroying property as in conventional dimethylsiloxane-containing defoaming agents. This silica powder preferably has a specific BET surface area of 50 m²/g or more, more preferably 50 to 400 m²/g for better dispersibility. This silica powder may be preferably fumed silica or colloidal silica treated with a silicon compound for a hydrophobic property in order to enhance its dispersibility in a solvent.

The present perfluoropolyether-modified polysiloxane has good water- and oil-repellency, chemical resistance, a lubricating property and demoldability and better affinity with organic solvents, paints, cosmetics and various coating materials than conventional perfluoropolyether-group-containing compounds and, therefore, is useful as an additive to cleaners and waxes in the field of household products and cosmetics; a mold release agent to improve demoldability in molding; an additive to provide grease with water- and oil-repellency; an additive to improve abrasion resistance of lubricant; an adjuvant to improve colorability and dispersibility of pigments in the industrial field of dyes and pigments; and an agent to provide a leveling property and a crater-preventing property to correct defects of paint.

The perfluoropolyether-modified polysiloxane, major agent of the present defoaming agent, has a small surface tension and good affinity with organic solvents and, therefore, shows a good effect of suppressing foaming in organic solvent systems. Therefore, the present defoaming agent can be used in a variety of industries where foaming occurs, such as chemical, petroleum, textile, pharmaceutical, and printing industries. More specifically, the present defoaming agent can be suitably used, for instance, in paints based on an organic solvent, dyes for fibers and cloths, inks for printing, lubricants and operating oils, chemical processes such as synthesis and distillation, and petroleum refining processes.

EXAMPLES

The present invention will be explained more specifically with reference of the following Examples, but shall not be limited thereto.

Example 1

To a flask equipped with a reflux condenser and a thermometer, were placed 332.6 grams of the vinyl group-containing perfluoropolyether represented by the following formula (10):

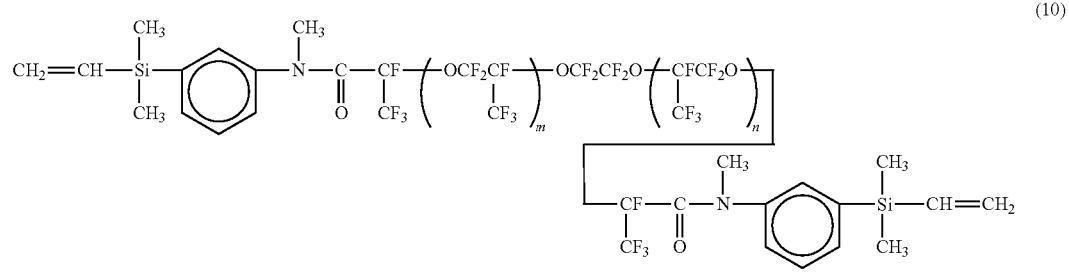

[Average of m + n = 35]

93.2 grams of the SiH group-containing polysiloxane represented by the following formula (11):

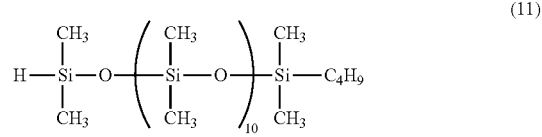

and 182.5 grams of hexafluorometaxylene. Then, 0.26 gram of a solution of a platinum/vinylsiloxane complex in toluene (platinum content: 1.3 mg) was added and heated at 80 degrees C. for one hour and, then, hexafluorometaxylene was distilled off under reduced pressure to obtain 404.5 grams of a pale yellow, pasty material.

The product obtained above was analyzed by ¹H-NMR and IR spectrometry and was found to be a compound represented by the following formula (12):

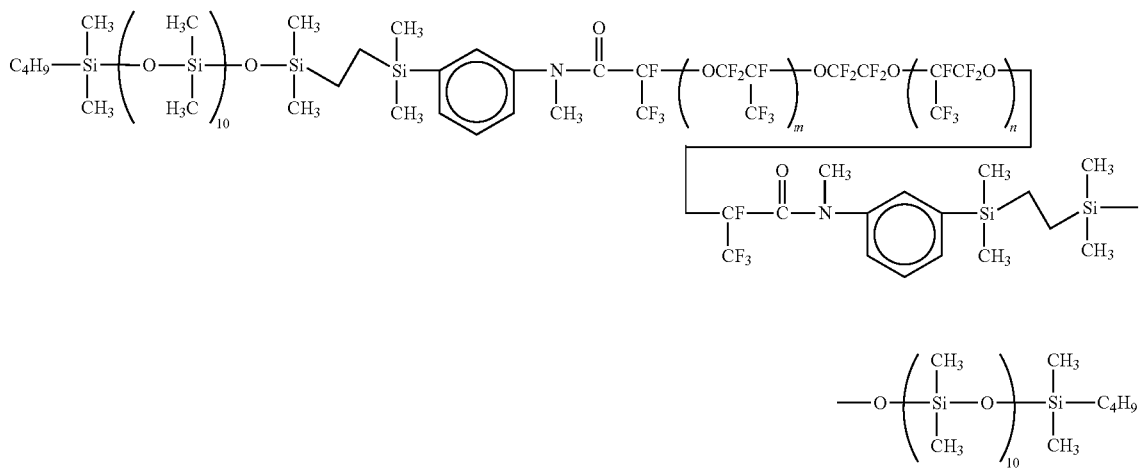

(12)

[Average of m + n = 35]

where a content of the fluorine atoms was 49.5% by mass. This product was used in Use Example 1 mentioned below. A 1% solution of this compound in methyl isobutyl ketone was used in Example 4.

The analysis results in $^1$H-NMR, JNM-NS50 ex JOEL Co. Ltd., are as shown below.

$^1$H-NMR (TMS reference, ppm): 0.1-0.6 (Si—C$\underline{H}_3$, 156H), 0.5-1.1 (Si—C$\underline{H}_2$—, C$\underline{H}_3$—, 18H), 1.1-1.6 (—C$\underline{H}_2$C$\underline{H}_2$—, 8H), 3.4 (—NC$\underline{H}_3$, 6H), 7.3-7.8 (—C$_6\underline{H}_4$—, 8H)

IR spectrum of compound I (KBr method, FT-730 ex Horiba) is shown in FIG. 1.

Example 2

To a flask equipped with a reflux condenser and a thermometer, were placed 216.9 grams of the vinyl group-containing perfluoropolyether represented by the following formula (13):

520.3 grams of the SiH group-containing polysiloxane represented by the following formula (14):

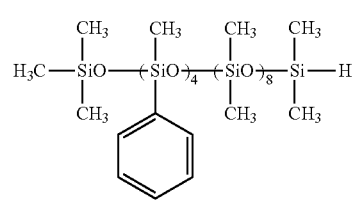

(14)

and 315 grams of decamethylcyclopentasiloxane. Then, 0.44 gram of a solution of a platinum/vinylsiloxane complex in toluene (platinum content: 2.2 mg) was added and heated at 80 degrees C. for one hour and, then, decamethylcyclopentasiloxane was distilled off under reduced pressure to obtain 685.5 grams of a pale brown, pasty material.

The product obtained above was analyzed by $^1$H-NMR and IR spectrometry and was found to be represented by the following formula (15)

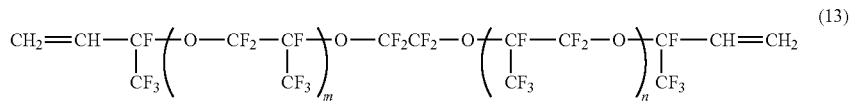

(13)

[Average of m + n = 6]

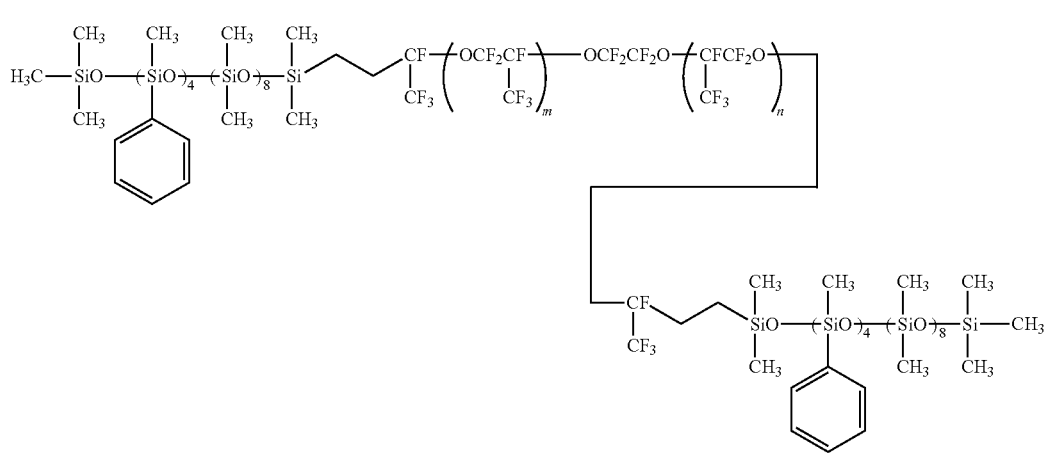

(15)

[Average of m + n = 6]

where a content of the fluorine atoms was 34.0% by mass. This compound was used in Use Example 2. A 1% solution of this compound in methyl isobutyl ketone was used in Example 5.

Example 3

To a flask equipped with a reflux condenser and a thermometer, were placed 296.5 grams of the vinyl group-containing perfluoropolyether represented by the following formula (16):
483.1 grams of the SiH group-containing polysiloxane represented by the following formula (17):

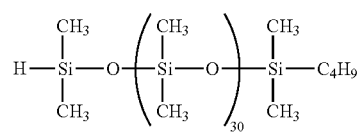

(17)

and 334 grams of hexafluorometaxylene. Then, 0.47 gram of a solution of a platinum/vinylsiloxane complex in toluene (platinum content: 2.3 mg) was added and heated at 80 degrees C. for one hour and, then, hexafluorometaxylene was distilled off under reduced pressure to obtain 740.0 grams of a pale yellow, oily material.

The product obtained above was analyzed by $^1$H-NMR and IR spectrometry and was found to be represented by the following formula (18):

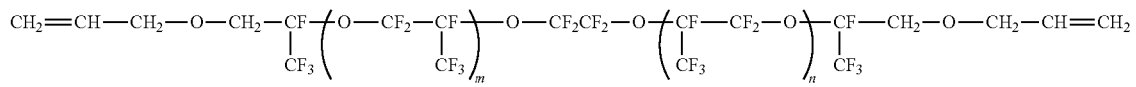

(16)

[Average of m + n = 15]

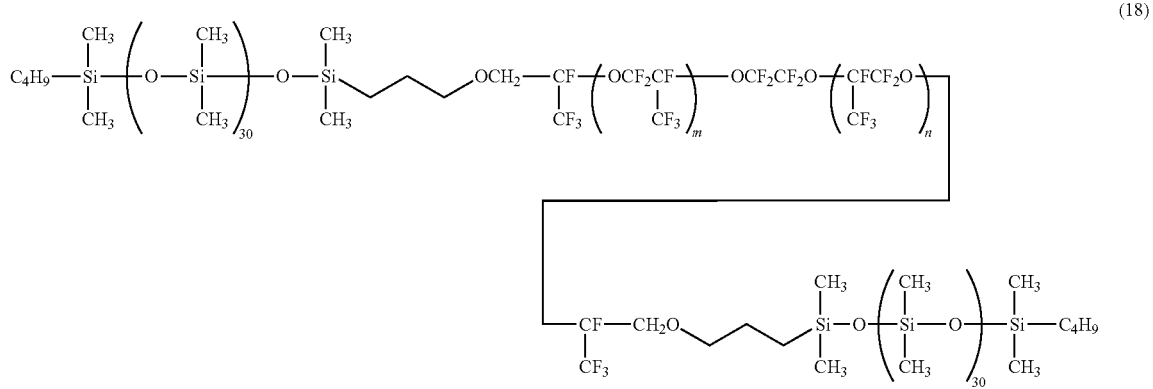

(18)

[Average of m + n = 15]

where a content of the fluorine atoms was 24.9% by mass. This compound was used in Use Example 3. A 1% solution of this compound in methyl isobutyl ketone was used in Example 6.

Preparation of a Compound for Comparison

To a flask equipped with a reflux condenser and a thermometer, were placed 470.1 grams of the alkenyl group-containing perfluoropolyether represented by the following formula (19):

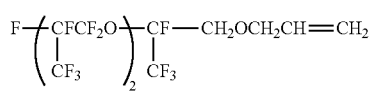

(19)

284.8 grams of the SiH group-containing polysiloxane represented by the following formula (20):

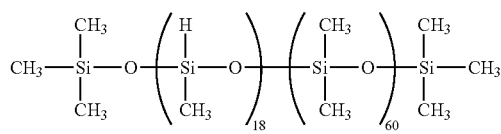

(20)

and 189 grams of hexafluorometaxylene. Then, 0.45 gram of a solution of a platinum/vinylsiloxane complex in toluene (platinum content: 2.3 mg) was added and heated at 80 degrees C. for one hour and, then, hexafluorometaxylene was distilled off under reduced pressure to obtain 731.6 grams of a pale yellow, oily material represented by the following formula (21):

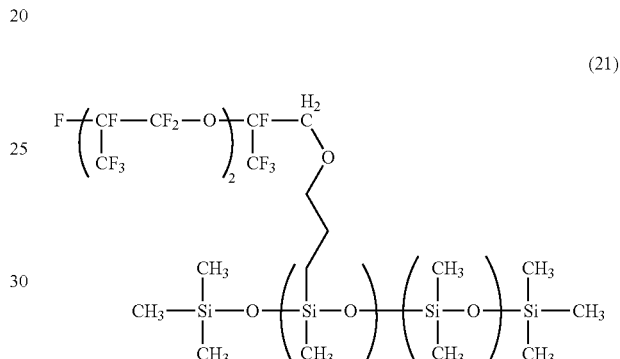

(21)

where a content of the fluorine atoms was 38.5% by mass. A 1% solution of the product obtained in methyl isobutyl ketone was used in Comparative Example 4.

Use Examples 1 to 3

To a transparent glass sample bottle, were placed 4.0 grams of each perfluoropolyether-modified polysiloxane of Examples 1 to 3 and 16.0 grams of the solvent shown in Table 1, shaken well and left still at room temperature for 1 hour. Then, the appearance was observed with naked eyes and the solubility was evaluated based on the following criteria. The results are as shown in Table 1.

+: Dissolved and transparent

−: White and translucent, but the polysiloxane is homogeneously dispersed.

−−: White and turbid, or a siloxane and a solvent were separated in two phases.

Comparative Examples 1 to 3

The solubility in each solvent shown in Table 1 was evaluated in the same manner as in the Use Examples, except that the following compound was used instead of the compounds of Examples 1 to 3.

For Comparative Example 1, polydimethylsiloxane (PDMS) with a viscosity of 200 cS at 25 degrees C., ex Shin-Etsu Chemical Co., Ltd.

For Comparative Example 2, perfluoropolyether-modified polysiloxane represented by formula (21) obtained in Preparation of a Compound for Comparison.

For Comparative Example 3, perfluoropolyether oligomer (PFPE), Galden HT-200, ex Solvay Solexis

TABLE 1

| Solvent | Solubility | | | | |
|---|---|---|---|---|---|
| | THF | MIBK | Isododecane | KF-995 | MXHF |
| Use Example 1 | + | + | + | + | + |
| Use Example 2 | + | + | + | + | + |
| Use Example 3 | + | + | + | + | + |
| Comparative Example 1 | + | + | + | + | -- |
| Comparative Example 2 | + | - | -- | -- | + |
| Comparative Example 3 | -- | -- | -- | -- | + |

THF: Tetrahydrofuran
MIBK: Methyl isobutyl ketone
KF-995: Decamethylcyclopentasiloxane, ex Shin-Etsu
MXHF: Metaxylene hexafluoride Examples 4 to 6 and Comparative Example 4

Evaluation 1 of a Defoaming Property

1. Dimethylpolysiloxane with a dynamic viscosity at 25 degrees C. of 1,000,000 mm$^2$/s, foaming adjuvant, was dissolved in methyl isobutyl ketone at a concentration of 5% by mass to prepare a foaming test solution. To 80 grams of the foaming test solution, was added 0.16 gram of a 20 ppm solution of each of the defoaming agents of Examples 1 to 3 and Preparation of a Compound for Comparison in methyl isobutyl ketone, mixed homogeneously and, then, gently poured into a 1000 ml measuring cylinder. Air was introduced continuously through a diffuser stone at a rate of 1 litter/min. and a volume of foam generated was followed with time. A mixture which did not contain the perfluoropolyether-modified polysiloxane was also tested as Reference Example 1. The results are as shown in Table 2.

TABLE 2

| | Volume of Foam in ml | | | | |
|---|---|---|---|---|---|
| Time | 30 sec. | 60 sec. | 120 sec. | 300 sec. | 600 sec. |
| Example 4 | 110 | 110 | 110 | 120 | 120 |
| Example 5 | 120 | 120 | 130 | 140 | 140 |
| Example 6 | 140 | 140 | 140 | 150 | 150 |
| Comparative Example 4 | 210 | 270 | 330 | 370 | 410 |
| Reference Example 1 | 420 | 530 | 650 | 700 | 900 |

Evaluation 2 of the Defoaming Property

The afore-mentioned procedures were repeated except that kerosene was used instead of methyl isobutyl ketone to evaluate the defoaming property of the defoaming agents. The results are as shown in Table 3.

TABLE 3

| | Volume of Foam in ml | | | | |
|---|---|---|---|---|---|
| Time | 30 sec. | 60 sec. | 120 sec. | 300 sec. | 600 sec. |
| Example 4 | 110 | 110 | 110 | 110 | 110 |
| Example 5 | 180 | 160 | 150 | 140 | 140 |
| Example 6 | 110 | 110 | 120 | 130 | 130 |
| Comparative Example 4 | 150 | 190 | 240 | 290 | 330 |

TABLE 3-continued

| | Volume of Foam in ml | | | | |
|---|---|---|---|---|---|
| Time | 30 sec. | 60 sec. | 120 sec. | 300 sec. | 600 sec. |
| Reference Example 1 | 600 | >1000 | >1000 | >1000 | >1000 |

INDUSTRIAL APPLICABILITY

As seen in Table 1, the present perfluoropolyether-modified polysiloxane is good in solubility in and affinity with many organic solvents, compared to the compounds of Comparative Examples 1 to 3. This is useful as an additive for cleaners and waxes in the field of household products and an additive for cosmetics; a mold release agent to improve demoldability in molding; an additive to provide grease with water- and oil-repellency; an additive to improve abrasion resistance of lubricant; an adjuvant to improve colorability and dispersibility of pigments in the industrial field of dyes and pigments; and an agent to provide a leveling property and a crater-preventing property to correct defects of paint. As seen in Tables 2 and 3, the present defoaming agent has a good foam-suppressing effect and a defoaming effect for organic solvents. Therefore, the present defoaming agent can be used in a variety of industries where foaming occurs, such as chemical, petroleum, textile, pharmaceutical, and printing industries. More specifically, the present defoaming agent can be suitably used, for instance, in paints based on an organic solvent, dyes for fibers and cloths, inks for printing, lubricants and operating oils, chemical processes such as synthesis and distillation, and petroleum refining processes.

The invention claimed is:
1. A perfluoropolyether-modified polysiloxane represented by general formula (1):

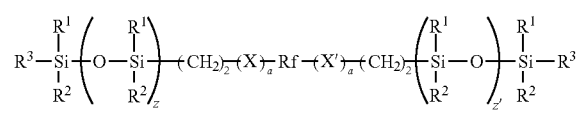

(1)

wherein
X is a divalent group represented by formula —CH$_2$—, —CH$_2$O—, —CH$_2$OCH$_2$— or —Y—NR—CO—,
wherein Y is a divalent group represented by formula —CH$_2$— or the following formula:

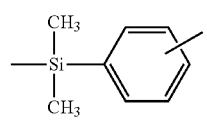

and R is a hydrogen atom, an alkyl group having 1 to 10 carbon atoms or an aryl group;
R$^1$, R$^2$, and R$^3$ are, independently of each other, an alkyl group having 1 to 10 carbon atoms or an aryl group;
X' is a divalent group represented by formula —CH$_2$—, —OCH$_2$—, —CH$_2$OCH$_2$— or —CO—NR—Y'—,
wherein Y' is a divalent group represented by formula —CH$_2$— or the following formula:

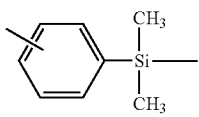

and R is as defined above;
a is, independently of each other, 0 or 1;
z and z' are, independently of each other, an integer of 5 to 100; and
Rf is a divalent group represented by the following general formula (2):

wherein
m and n are integer of 1 to 150, provided that an average of a total of m and n is 2 to 200;
r is an integer of 0 to 6;
t is 2 or 3; and
$C_tF_{2t}$ is linear or branched;
or by the following general formula (3):

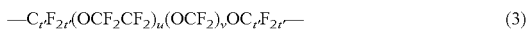

wherein
u is an integer of 1 to 200;
v is an integer of 1 to 50;
t' is an integer of 1 to 3; and
$C_{t'}F_{2t'}$ is linear or branched.

2. The perfluoropolyether-modified polysiloxane represented by general formula (4):

(4)

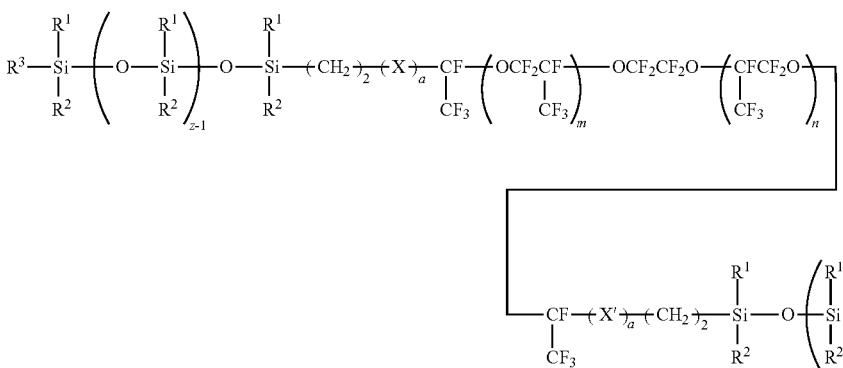

wherein
a is, independently of each other, 0 or 1;
X is a divalent group represented by formula —$CH_2$—, —$CH_2O$—, —$CH_2OCH_2$— or —Y—NR—CO—,
wherein Y is a divalent group represented by formula —$CH_2$— or the following formula:

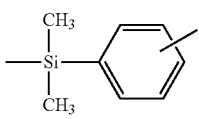

and R is a hydrogen atom, an alkyl group having 1 to 10 carbon atoms or an aryl group;

X' is a divalent group represented by formula —$CH_2$—, —$OCH_2$—, —$CH_2OCH_2$— or —CO—NR—Y'—,
wherein Y' is a divalent group represented by formula —$CH_2$— or the following formula:

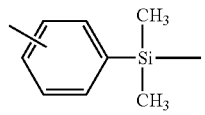

and R is a hydrogen atom, an alkyl group having 1 to 10 carbon atoms or an aryl group;
$R^1$, $R^2$, and $R^3$ are, independently of each other, an alkyl group having 1 to 10 carbon atoms or an aryl group;
m and n are integer of 1 to 150, provided that an average of a total of m and n is 2 to 200; and
z and z' are, independently of each other, an integer of 5 to 100.

3. The perfluoropolyether-modified polysiloxane according to claim 1 or 2, wherein the fluorine atoms account for 20 to 70% by mass of the whole molecule of the perfluoropolyether-modified polysiloxane.

4. A method for preparing the perfluoropolyether-modified polysiloxane described in claim 2, wherein a vinyl group-containing perfluoropolyether represented by general formula (5):

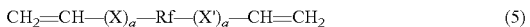

wherein Rf, X, X' and a are as defined above, is hydrosilylated with an SiH group-containing polysiloxane represented by general formula (6):

(6)

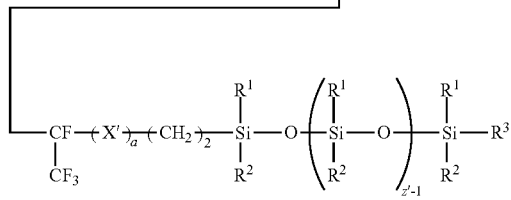

wherein $R^1$, $R^2$, $R^3$, and z are as defined above.

5. A defoaming agent comprising the perfluoropolyether-modified polysiloxane described in claim 1.

* * * * *